United States Patent
Huang

(10) Patent No.: US 10,007,507 B2
(45) Date of Patent: Jun. 26, 2018

(54) METHOD FOR UPDATING FIRMWARE OF A BATTERY INCLUDED IN A RECHARGEABLE BATTERY MODULE, PORTABLE ELECTRONIC DEVICE, AND RECHARGEABLE BATTERY MODULE

(71) Applicant: Wistron Corporation, New Taipei (TW)

(72) Inventor: Wei Chieh Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days. days.

(21) Appl. No.: 14/026,341

(22) Filed: Sep. 13, 2013

(65) Prior Publication Data
US 2014/0208092 A1 Jul. 24, 2014

(30) Foreign Application Priority Data
Jan. 22, 2013 (TW) .............................. 102102328 A

(51) Int. Cl.
G06F 9/45 (2006.01)
G06F 8/654 (2018.01)
G06F 9/445 (2018.01)
G06F 9/4401 (2018.01)

(52) U.S. Cl.
CPC .............. *G06F 8/654* (2018.02); *G06F 8/665* (2013.01); *G06F 9/4401* (2013.01)

(58) Field of Classification Search
CPC . G06F 8/65; G06F 8/654; G06F 8/665; G06F 9/4401
See application file for complete search history.

(56) References Cited

U.S. PATENT DOCUMENTS

| 6,138,233 | A  | * | 10/2000 | Lim ................................. 713/1 |
| 6,615,404 | B1 | * | 9/2003  | Garfunkel ............... G06F 8/654 |
|           |    |   |         | 717/173 |
| 6,771,491 | B2 | * | 8/2004  | Tojo et al. ............... 361/679.31 |
| 6,937,947 | B2 | * | 8/2005  | Trembley ........................ 702/63 |

(Continued)

FOREIGN PATENT DOCUMENTS

TW           201032049 A1      9/2010

OTHER PUBLICATIONS

The Office Action issued to Taiwanese Counterpart Application No. 102102328 by the Taiwan Intellectual Property Office dated Mar. 26, 2015; 7 pages.

(Continued)

*Primary Examiner* — Ziaul A Chowdhury
(74) *Attorney, Agent, or Firm* — John A. Fortkort; Fortkort & Houston PC

(57) ABSTRACT

In a method for updating firmware of a battery included in a rechargeable battery module of a portable electronic device, the portable electronic device stores a booting instruction set of the firmware in a battery monitoring unit of the rechargeable battery module, and stores a basic input/output system (BIOS) of the portable electronic device in a non-volatile memory disposed externally of the rechargeable battery module. In response to BIOS update information that includes an updated main instruction set of the firmware, the portable electronic device updates the BIOS, including the main instruction set of the firmware using the BIOS update information.

13 Claims, 4 Drawing Sheets

(56) References Cited

U.S. PATENT DOCUMENTS

| | | | |
|---|---|---|---|
| 7,197,634 B2* | 3/2007 | Kruger et al. | 713/1 |
| 7,596,687 B2* | 9/2009 | Sultenfuss et al. | 713/100 |
| 7,953,965 B2* | 5/2011 | Qin et al. | 717/171 |
| 8,051,319 B2* | 11/2011 | Huang et al. | 713/340 |
| 8,344,687 B2* | 1/2013 | Nishikawa et al. | 320/106 |
| 2003/0076072 A1* | 4/2003 | Tojo et al. | 320/134 |
| 2003/0229752 A1* | 12/2003 | Venkiteswaran | G06F 9/4408 711/103 |
| 2004/0143828 A1* | 7/2004 | Liu et al. | 717/168 |
| 2005/0055595 A1* | 3/2005 | Frazer | G06F 8/665 713/400 |
| 2005/0071621 A1* | 3/2005 | Rothman | G06F 9/4406 713/2 |
| 2005/0088201 A1* | 4/2005 | Devlin et al. | 326/38 |
| 2005/0096086 A1* | 5/2005 | Singamsetty | 455/557 |
| 2006/0096771 A1* | 5/2006 | Brotto | B25B 21/00 173/217 |
| 2006/0277401 A1* | 12/2006 | Sultenfuss et al. | 713/1 |
| 2008/0270685 A1* | 10/2008 | Kato | G06F 8/65 711/112 |
| 2008/0313452 A1* | 12/2008 | Qin et al. | 713/2 |
| 2009/0254765 A1* | 10/2009 | Huang et al. | 713/300 |
| 2010/0213891 A1* | 8/2010 | Nishikawa | H01M 10/42 320/106 |
| 2010/0235822 A1* | 9/2010 | Jamerson | H01M 2/1066 717/168 |
| 2012/0005497 A1* | 1/2012 | Tsukamoto | G06F 8/654 713/310 |
| 2012/0117367 A1* | 5/2012 | Lu | G06F 9/4401 713/2 |
| 2013/0185299 A1* | 7/2013 | Landry | G06F 9/4401 707/736 |
| 2014/0007067 A1* | 1/2014 | Nelson | G06F 8/665 717/168 |
| 2017/0229895 A1* | 8/2017 | Farhi | H02J 7/0075 |

OTHER PUBLICATIONS

Abridged English translation of sections boxed in red on Office Action issued to Taiwanese Counterpart Application No. 102102328 by the Taiwan Intellectual Property Office dated Mar. 26, 2015; 4 pages.

The Office Action issued to Taiwanese Counterpart Application No. 102102328 by the Taiwan Intellectual Property Office dated Nov. 24, 2014 (11 pages) along with an English translation of the sections boxed in red (7 pages).

* cited by examiner

METHOD FOR UPDATING FIRMWARE OF A BATTERY INCLUDED IN A RECHARGEABLE BATTERY MODULE, PORTABLE ELECTRONIC DEVICE, AND RECHARGEABLE BATTERY MODULE

CROSS-REFERENCE TO RELATED APPLICATION

This application claims priority of Taiwanese Application No. 102102328, filed on Jan. 22, 2013.

BACKGROUND OF THE INVENTION

1. Field of the Invention

The invention relates to a method for updating firmware, and more particularly to a method for updating firmware of a battery.

2. Description of the Related Art

Generally, some problems associated with a battery of a portable electronic device (e.g., a notebook computer) may be addressed by updating firmware of the battery, instead of replacing the battery. FIG. 1 illustrates such a conventional portable electronic device 1, which includes a rechargeable battery module 100. The rechargeable battery module 100 includes a battery 11, a battery monitoring unit 12 and a non-volatile memory 13. The battery monitoring unit 12 is capable of monitoring a power state of the battery. The non-volatile memory 13 may be a programmable read-only memory (PROM), and is stored with a booting instruction set 14 that enables the battery 11 to complete a basic booting operation, and a main instruction set 15 that is used to manage a power supply state of the battery 11.

Typically, the term "firmware update" refers to operations for updating the main instruction set 15 stored in the non-volatile memory 13. This can be achieved through a firmware updating procedure as shown in FIG. 2.

In step 21 of the firmware updating procedure, an application associated with firmware updating is executed by a processor a central processing unit) of the conventional portable electronic device 1, responsive to a user-initiated activation command (for example, sent by a user under an operating system). The processor 16 executing the application then causes an embedded controller 17 (such as a keyboard controller), via a chipset 19, to notify the battery monitoring unit 12 of the rechargeable battery module 100 to perform a firmware update in step 22.

The battery monitoring unit 12 then determines whether the battery 11 supports the firmware update in step 23. When such a determination is affirmative, in step 24, the application causes the embedded controller 17 to write a segment of updated firmware into the non-volatile memory 13 of the rechargeable battery module 100, via the battery monitoring unit 12. Afterward, when the segment of the updated firmware has been successfully written into the non-volatile memory 13, in step 25, the battery monitoring unit 12 notifies the embedded controller 17 accordingly. The procedure may be terminated when the segment of the updated firmware is not written into the non-volatile memory 13.

The application then determines whether the entire updated firmware has been successfully written into the non-volatile memory 13 in step 26, and notifies the battery monitoring unit 12 that the firmware updating procedure is completed in 27. When the determination made in step 26 is not affirmative, the flow goes back to step 24 to perform another writing operation to write another segment of the updated firmware into the non-volatile memory 13.

In order to transmit the updated firmware to the non-volatile memory 13, the application first invokes a set of advanced configuration and power interface source language (ASL) code from a basic input/output system (BIOS) 18 of the conventional portable electronic device 1. Thus, the application is able to cause the embedded controller 17 to communicate with the battery monitoring unit 12 using a system management bus (SMBUS) interconnection. That is, to execute the firmware updating procedure, at least the operating system, the BIOS, the battery monitoring unit 12, the embedded controller 17, and the chipset 19 are involved. When communication between two of the many involved components is interrupted, the firmware updating procedure may not be completed correctly.

Furthermore, the updated firmware typically has a size (e.g., 4K Bytes) larger than the maximum capacity that can be transmitted using the SMBUS. As a result, steps 24 to 26 may have to be repeated numerous times in order to transmit the entire updated firmware to the non-volatile memory 13 in order to complete the firmware updating procedure. The repeated writing operations may lead to an increase of the time taken for the firmware updating procedure.

SUMMARY OF THE INVENTION

Therefore, the object of the present invention is to provide a method that is able to alleviate at least some of the drawbacks mentioned above.

Accordingly, a method of the present invention is for updating firmware of a battery included in a rechargeable battery module of a portable electronic device. The method is to be implemented by the portable electronic device and comprises the steps of:

(A) storing a booting instruction set of the firmware in a battery monitoring unit of the rechargeable battery module, the booting instruction set to enable the battery to complete a basic booting operation;

(B) storing a basic input/output system (BIOS) of the portable electronic device in a non-volatile memory of the portable electronic device, the non-volatile memory being disposed externally of the rechargeable battery module, the BIOS including a main instruction set of the firmware, the main instruction set being used to manage a power supply state of the battery; and (C) in response to BIOS update information that includes an updated main instruction set of the firmware updating, using the BIOS update information, the BIOS, including the main instruction set of the firmware that are stored in the non-volatile memory of the portable electronic device.

Another object of the present invention is to provide a portable electronic device that is capable of performing the above method.

According to another aspect, a portable electronic device of the present invention comprises a rechargeable battery module, a non-volatile memory, and a processor.

The rechargeable battery module includes a battery and a battery monitoring unit. The battery monitoring unit stores a booting instruction set of firmware of the battery therein. The booting instruction set enables the battery to complete a basic booting operation.

The non-volatile memory is disposed externally of the rechargeable battery module and stores a basic input/output system (BIOS) of the portable electronic device. The BIOS includes a main instruction set of the firmware of the battery. The main instruction set is used to manage a power supply state of the battery.

The processor is coupled to the rechargeable battery module and the non-volatile memory, and is configured to execute the BIOS.

According to yet another aspect, a portable electronic device of the present invention is for use with a rechargeable battery module serving as a bower source of the portable electronic device. The rechargeable battery module includes a battery and a battery monitoring unit. The battery monitoring unit stores a booting instruction set of firmware of the battery therein. The booting instruction set enables the battery to complete a basic booting operation. The portable electronic device comprises a non-volatile memory and a processor.

The non-volatile memory is disposed externally of the rechargeable battery module and stores a basic input/output system (BIOS) of the portable electronic device. The BIOS includes a main instruction set of the firmware of the battery. The main instruction set is used to manage a power supply state of the battery. The processor is configured to execute the BIOS.

Yet another object of the present invention is to provide a rechargeable battery module. The rechargeable battery module is to be coupled to a portable electronic device to serve as a power source of the portable electronic device.

The rechargeable battery module comprises a battery and a battery monitoring unit that stores a booting instruction set of firmware of the battery. The booting instruction set enables the battery to complete a basic booting operation. The rechargeable battery module does not store a main instruction set of the firmware. The main instruction set is an instruction set used to manage a power supply state of the battery.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
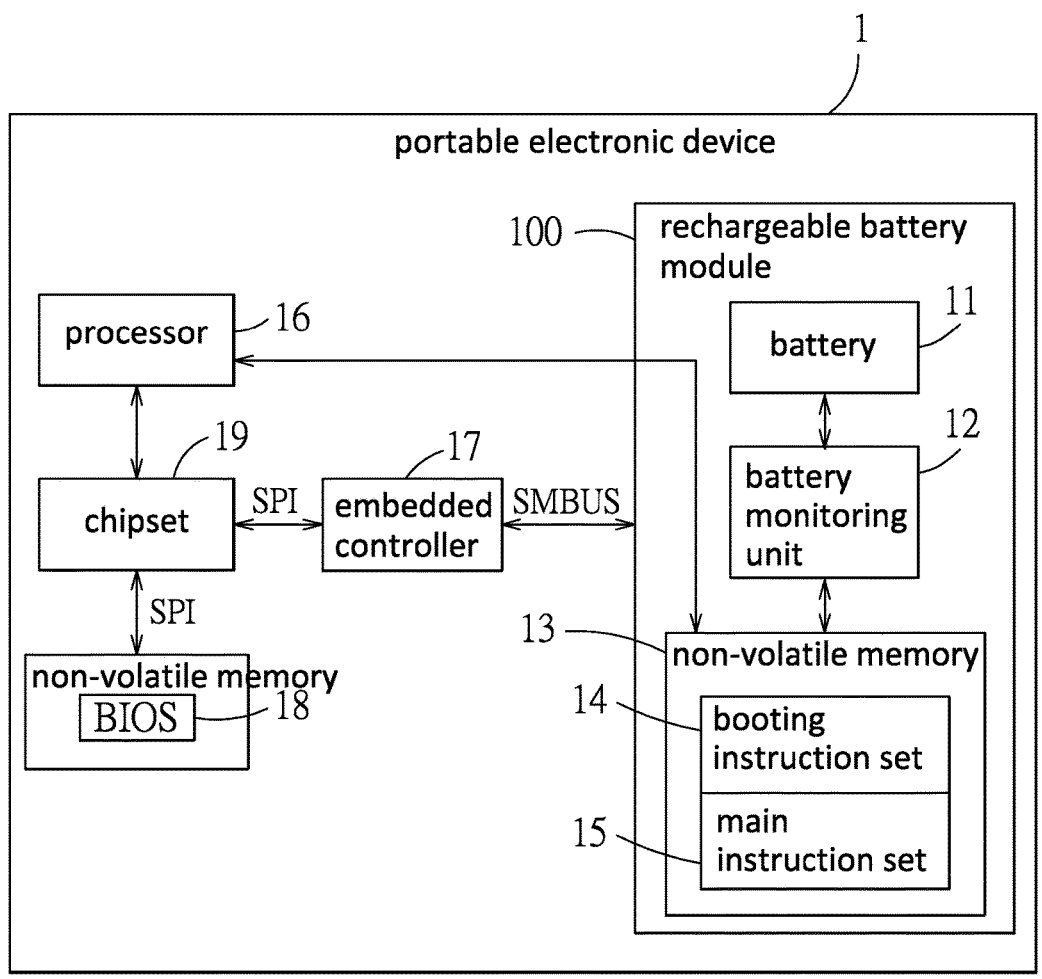
FIG. 1 is a schematic functional block diagram of a conventional portable electronic device.
Figure 2:
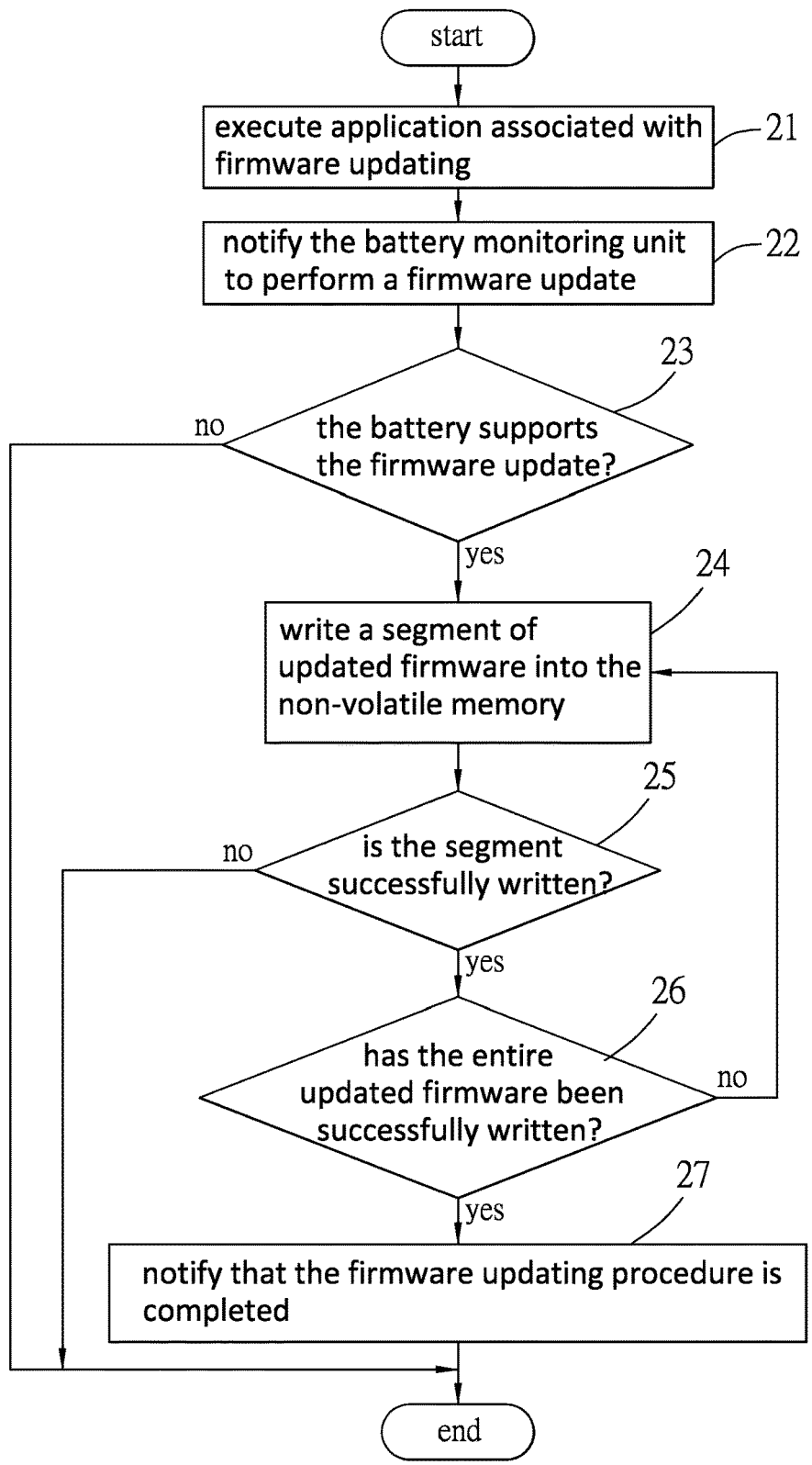
FIG. 2 is a flow chart of a conventional method for updating firmware of a rechargeable battery module of the portable electronic device.

Before the present invention is described in greater detail, it should be noted that like elements are denoted by the same reference numerals throughout the disclosure.

Figure 3:
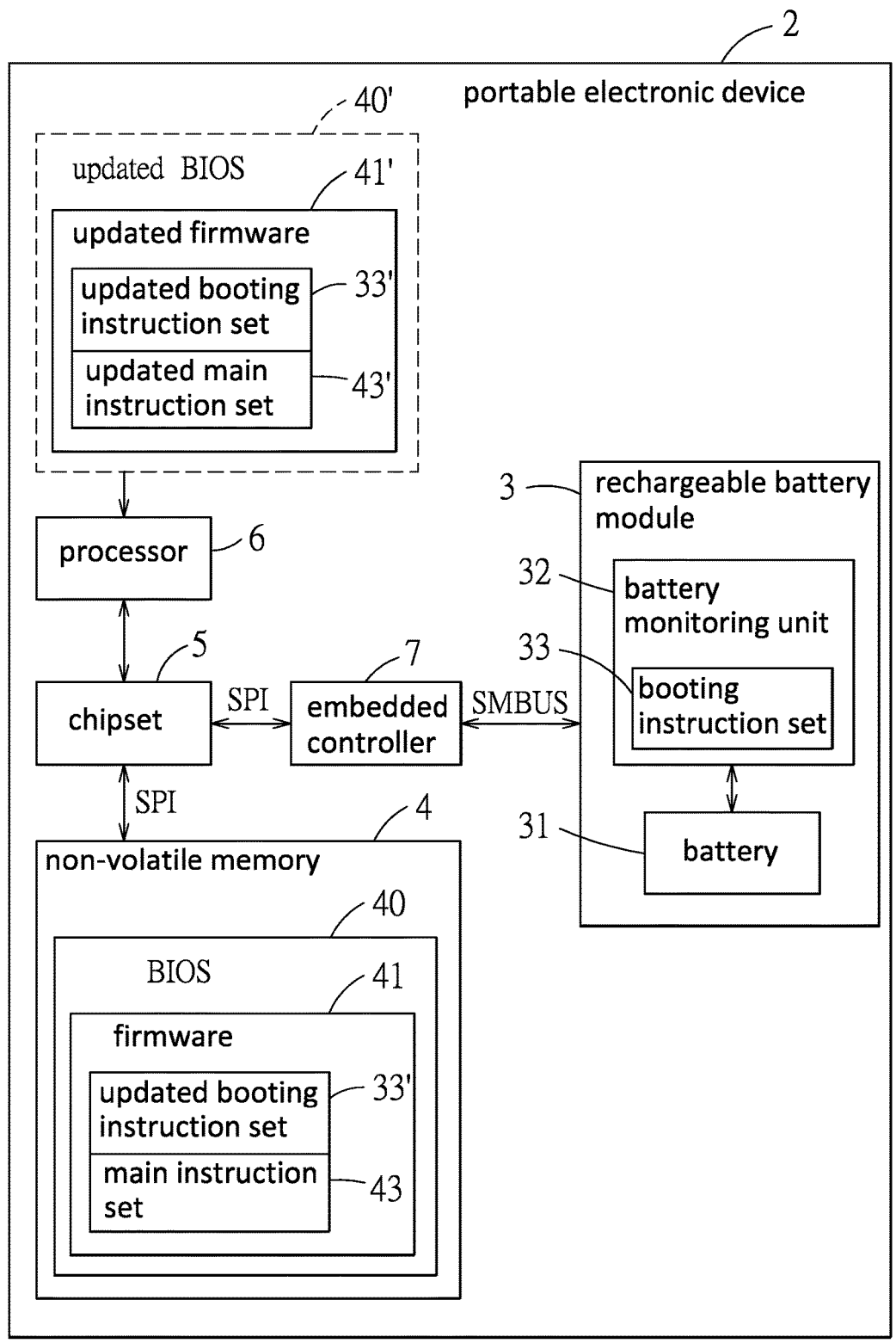
FIG. 3 is a schematic functional block diagram of an embodiment of a portable electronic device according to the invention.

As shown in FIG. 3, the preferred embodiment of a portable electronic device 2 according to the present invention may be embodied as a notebook computer, an ultrabook, or the like. The portable electronic device comprises a rechargeable battery module 3, a non-volatile memory 4, a processor 6 and an embedded controller 7.

The rechargeable battery module 3 serves as a power source of the portable electronic device 2, and includes a rechargeable battery 31, and a battery monitoring unit 32. The battery monitoring unit 32 may be embodied as an integrated circuit (IC), and is configured to monitor various conditions of the battery 31, such as a remaining power, an electrical current supplied by the battery 31, a battery charge status of the battery 31, or the like. The battery monitoring unit 32 also stores a booting instruction set 33 of firmware of the battery 31 therein to enable the battery 31 to complete a basic booting operation.

The non-volatile memory 4, such as a programmable read-only memory (PROM), is disposed externally of the rechargeable battery module 3, and stores a basic input/output system (BIOS) 40 of the portable electronic device 2 therein. In this embodiment, the BIOS 40 is incorporated with another firmware portion 41 of the battery 31. The firmware portion 41 includes a main instruction set 43, which, is used to manage a power supply state of the battery 31 such that the same can be displayed for a user. Some exemplary functions of the main instruction set 43 may include detecting a battery remaining percentage and/or time of the battery 31, a charge rate (C-rate) of the rechargeable battery module 3, a battery wear level (i.e., capacity reduced due to usage) of the battery 31, and performing a full charge/discharge procedure of the battery 31.

The processor 6 in this embodiment may be a central processing unit (CPU), and is able to access the non-volatile memory 4 and to communicate with the embedded controller 7 via a chipset 5. Specifically, the chipset 5 includes a northbridge chip for communicating with the processor 6, and as southbridge chip for communicating with the non-volatile memory 4 and the embedded controller 7 through, for example, a serial peripheral interface (SPI) bus.

The embedded controller 7 in this embodiment may include a keyboard controller (KBC), and is coupled to the rechargeable battery module 3 and the non-volatile memory 4. In some embodiments, the embedded controller 7 may be embodied as the KBC.

The embedded controller 7 is incorporated with a number of functions associated with the hardware components of the portable electronic device 2.

For example, the embedded controller 7 may be configured to manage one or more devices that are coupled to one or more PS/2 connectors of the portable electronic device 2 (e.g., a keyboard and/or a mouse), obtain scancode from a keyboard coupled to the portable electronic device 2, manage a set of hotkeys and/or keyboard shortcuts defined by the operating system (OS) or the user, control operation of a set of light-emitting diodes (LED) on the portable electronic device 2, control a brightness of a display (e.g., a liquid-crystal display (LCD)), manage the power supply state of the battery 31, controlling a volume of a speaker coupled to the portable electronic device 2, detect a connection of the battery 31 to the portable electronic device 2, performing thermal control, or the like. The abovementioned functions may be carried out using a set of advanced configuration and power interface source language (ASL) codes from the BIOS 40.

Typically, when the portable electronic device 2 is powered on, the processor 6 executes the BIOS 40 and loads some key portions of the BIOS 40, such as background processes, into a main memory module (not shown in the Figures) that can be accessed by the processor 6. This is done to speed up the power-on self-test (POST) routine. In this embodiment, the firmware portion 41 of the battery 31 is similarly loaded into the main memory module, so that an update of the main instruction set 43 of the firmware portion 41 may be performed by one of the background processes.

Once the firmware portion 41 is loaded into the main memory module, the processor 6 is able to manage the power supply state of the battery 31 using the main instruction set 43. For example, when the user requests power supply information of the battery 31 (e.g., an electrical current supplied by the battery 31, a currently remaining power, a charge-discharge state, or the like), the processor 6 may in turn request, via the embedded controller 7, the battery monitoring unit 32 to periodically report related information to the processor 6.

In response, the embedded controller 7 gathers the related information from the battery monitoring unit 32, and transmits the same to the processor 6 via the chipset 5. The processor 6 then executes the main instruction set 43 to process the related information in order to generate the power supply information. As a result, the portable electronic device 2 is able to provide the user with the power supply information through any suitable output device such as a display, an indicator light, or the like.

The configuration of the portable electronic device 2 enables the firmware portion 41 of the battery 31 to be updated along with the BIOS 40. In embodiments where the portable electronic device 2 is embodied as an ultrabook that typically employs a "one-piece" design, meaning that the rechargeable battery module 3 is not able to be detached from the portable electronic device 2 (i.e., a common user may not be able to replace the battery 31 by himself/herself), malfunction of the battery 31 of such portable electronic device 2 may cause inconvenience. However, it is known from past experience that some problems associated with the battery 31 may be addressed by updating the firmware portion 41 instead of replacing the battery 31. Therefore, this configuration of the portable electronic device 2 may find utility in the above embodiments.

Figure 4:
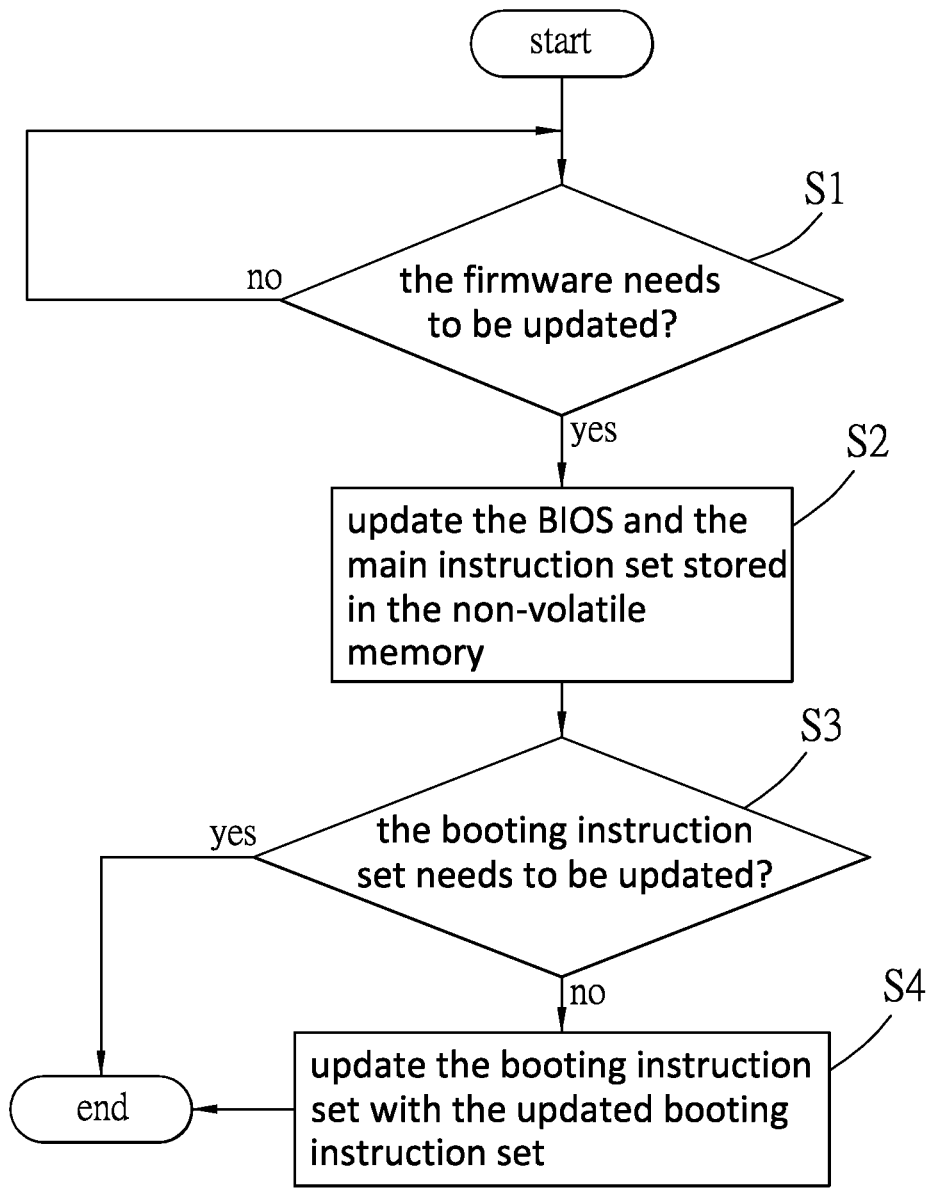
FIG. 4 is a flow chart of a method for updating firmware of a rechargeable battery module of the portable electronic device, according to the invention.

FIG. 4 illustrates steps of a method that is implemented by the portable electronic device 2 for updating the firmware portion 41 of the battery 31. It is noted that, in this embodiment, the booting instruction set 33 is pre-stored in the battery monitoring unit 32 of the rechargeable battery module 3, while the main instruction set 43 is pre-stored in the non-volatile memory 4 of the portable electronic device 2.

In step S1 of the method, the processor 6 determines whether the firmware portion 41 needs to be updated. This step may be performed during the POST routine, or initiated by the user under the OS.

When the determination made in step S1 is affirmative, the flow proceeds to step S2, in which the processor 6 updates, using BIOS update information, the BIOS 40 and the main instruction set 43 of the firmware portion 41 that are stored in the non-volatile memory 4.

Specifically, the BIOS update information may be obtained by the portable electronic device 2 from an external network (e.g., Internet), internal storage medium of the portable electronic device 2 (e.g., a hard disk) or other external storage medium (e.g., a flash drive or an optical disk that can be coupled to the portable electronic device 2).

In this embodiment, the BIOS update information includes an updated BIOS 40' having updated firmware portion 41' incorporated therein. The updated firmware portion 41' has at least an updated main instruction set 43'. In response to the BIOS update information, the processor 6 performs the updating of the BIOS 40.

The updating of the BIOS 40 and the main instruction set 43 of the firmware portion 41 may be performed by the processor 6 using, for example, BIOS updating software (such as WinFlash, DosFlash, or the like) that is capable of writing the BIOS update information into the non-volatile memory 4. The updating is then completed. In some cases, when the writing is completed, the portable electronic device 2 may need to be restarted in order for the updated BIOS 40' to take effect.

In some embodiments, in addition to the main instruction set 43, the booting instruction set 33 of the firmware of the battery 31 may be updated as well.

Accordingly, in such embodiments, the BIOS update information further includes an updated booting instruction set 33' which, in step S2, is written into the non-volatile memory 4. After the updating of the main instruction set 43 has been completed, the embedded controller 7 notifies the battery monitoring unit 32. Thereafter, upon receipt of a response signal from the battery monitoring unit 32, in step S3, the embedded controller 7 compares the updated booting instruction set 33' included in the BIOS update information and the booting instruction set 33 stored in the battery monitoring unit 32, in order to determine whether the booting instruction set 33 needs to be updated.

When the updated booting instruction set 33' included in the BIOS update information is different from the booting instruction set 33 stored in the battery monitoring unit 32 (indicating that the booting instruction set 33 needs to be updated), in step S4, the embedded controller 7 updates the booting instruction set 33 with the updated booting instruction set 33'.

In some embodiments, step S3 may be performed by the embedded controller 7 as soon as the updating of the main instruction set 43 is completed. In some cases, when the updating of the booting instruction set 33 is completed, the portable electronic device 2 may need to be restarted in order for the updated booting instruction set 33' to take effect.

To sum up, one effect of this invention is that by storing the main instruction set 43 of the firmware portion 41 in the non-volatile memory 4 disposed externally of the rechargeable battery module 3 instead of in the battery monitoring unit 32, the processor 6 does not need to communicate with the battery monitoring unit 32 via the embedded controller 7, or perform repeated writing operations to write segments of the updated firmware portion 41' into the battery monitoring unit 32. As a result, the updating of the firmware portion 41 can be performed more efficiently with a significantly reduced risk of failure.

Another effect of this invention is that since the rechargeable battery module 3 does not store the main instruction set 43 of the firmware portion 41, the memory device of the rechargeable battery module 3 may not need the size of a conventional rechargeable battery module and the area reserved to the memory device in the rechargeable battery module 3 may be subsequently smaller. In some embodiments, since the booting instruction set 33 of the battery may be stored in the battery monitoring unit 32 instead of the memory device of the rechargeable battery module 3, the memory device may be omitted from the rechargeable battery module 3 altogether. As a result, the rechargeable battery module 3 may be manufactured with reduced size and costs.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for updating firmware of a battery included in a rechargeable battery module of a portable electronic device, said method to be implemented by the portable electronic device and comprising the steps of:
- (A) storing a booting instruction set of the firmware in a battery monitoring unit of the rechargeable battery module, the booting instruction set to enable the battery to complete a basic booting operation, wherein the booting instruction set is not used to manage the power supply state of the battery;
- (B) storing a basic input/output system (BIOS) of the portable electronic device in a nonvolatile memory of the portable electronic device, the non-volatile memory being disposed externally of the rechargeable battery module, the BIOS including a main instruction set of the firmware, the main instruction set being used to manage a power supply state of the battery, wherein the main instruction set of the firmware is not stored in the battery monitoring unit of the rechargeable battery module; and
- (C) in response to BIOS update information that includes an updated main instruction set of the firmware, firmware: replacing the main instruction set of the firmware that is included in the BIOS and that is stored in the non-volatile memory of the portable electronic device with the updated main instruction set of the firmware, wherein the BIOS update information further includes an updated booting instruction set of the firmware;
- (D) comparing, by an embedded controller of the portable electronic device, the updated booting instruction set of the firmware included in the BIOS update information and the booting instruction set of the firmware stored in the battery monitoring unit; and
- (E) when the updated booting instruction set of the firmware included in the BIOS update information is different from the booting instruction set of the firmware stored in the battery monitoring unit, updating the booting instruction set of the firmware stored in the battery monitoring unit with the updated booting instruction set.

2. The method of claim 1, wherein, in step (C), updating the BIOS is done by a processor of the portable electronic device writing the BIOS update information into the non-volatile memory.

3. The method of claim 1, wherein the embedded controller is a keyboard controller.

4. The method of claim 1, wherein the rechargeable battery module includes a battery, a battery monitoring unit and a second non-volatile memory, and wherein the booting instruction set is stored in the second non-volatile memory.

5. The method of claim 1, wherein the portable electronic device is a computer, and wherein, when the BIOS is updated, the main instruction set of the firmware stored in the first non-volatile memory is updated without updating the booting instruction set of the firmware.

6. The method of claim 1, wherein the battery monitoring unit monitors at least one condition of the battery selected from the group consisting of remaining power, electrical current supplied by the battery, and the charge status of the battery.

7. The method of claim 1, wherein the main instruction set performs at least one function selected from the group consisting of detecting a remaining percentage of battery charge, detecting a remaining time of battery charge, determining the charge rate of the rechargeable battery module, determining the wear level of the battery, and performing a full charge/discharge procedure on the battery.

8. The method of claim 1, wherein the portable electronic device includes an embedded controller and at least one PS/2 connector, wherein the embedded controller manages at least one device that is coupled to the at least one PS/2 connector, and wherein the at least one device is selected from the group consisting of a keyboard and a mouse.

9. The method of claim 1, wherein the portable electronic device includes an embedded controller, a processor and a main memory module, and wherein, when the portable electronic device is powered on, the processor loads into the main memory module portions of the BIOS and the firmware stored in the battery module.

10. A portable electronic device comprising:
- a rechargeable battery module including a battery and a battery monitoring unit, said battery monitoring unit storing a booting instruction set of firmware of said battery therein, the booting instruction set to enable said battery to complete a basic booting operation;
- a non-volatile memory that is disposed externally of said rechargeable battery module and that stores a basic input/output system (BIOS) of the portable electronic device, the BIOS including a main instruction set of the firmware of said battery, the main instruction set being used to manage a power supply state of said battery; and
- a processor coupled to said rechargeable battery module and said non-volatile memory, and configured to execute the BIOS;
- wherein said rechargeable battery module does not store the main instruction set of the firmware, and wherein the booting instruction set is not used to manage the power supply state of the battery;
- wherein said processor is responsive to BIOS update information, that includes an updated main instruction set of the firmware, to update, using the BIOS update information, the BIOS, including the main instruction set of the firmware that are stored in said non-volatile memory;
- wherein said portable electronic device further comprises an embedded controller coupled to said rechargeable battery module and said non-volatile memory,
- wherein the BIOS update information further includes an updated booting instruction set of the firmware;
- wherein said embedded controller is configured to compare the updated booting instruction set of the firmware included in the BIOS update information and the booting instruction set of the firmware stored in said battery monitoring unit; and
- wherein, when the updated booting instruction set of the firmware included in the BIOS update information is different from the booting instruction set of the firmware stored in said battery monitoring unit, said embedded controller is further configured to update the booting instruction set of the firmware stored in said battery monitoring unit with the updated booting instruction set.

11. The portable electronic device of claim 10, wherein said embedded controller is a keyboard controller.

12. A portable electronic device for use with a rechargeable battery module serving as a power source of said portable electronic device, the rechargeable battery module including a battery and a battery monitoring unit, the battery monitoring unit storing a booting instruction set of firmware of the battery therein, the booting instruction set to enable the battery to complete a basic booting operation, said portable electronic device comprising:
- a non-volatile memory that is disposed externally of the rechargeable battery module and that stores a basic input/output system (BIOS) of said portable electronic device, the BIOS including a main instruction set of the firmware of the battery, the main instruction set being used to manage a power supply state of the battery; and a processor configured to execute the BIOS;

wherein said rechargeable battery module does not store a main instruction set of the firmware;

wherein the booting instruction set is not used to manage the power supply state of the battery;

wherein said processor is responsive to BIOS update information, which includes an updated main instruction set of the firmware, to update, using the BIOS update information, the BIOS, including the main instruction set of the firmware that are stored in said non-volatile memory;

wherein said portable electronic device further comprises an embedded controller coupled to said non-volatile memory and to be coupled to the rechargeable battery module;

wherein the BIOS update information further includes an updated booting instruction set of the firmware;

wherein said embedded controller is configured to compare the updated booting instruction set of the firmware included in the BIOS update information and the booting instruction set of the firmware stored in the battery monitoring unit;

wherein, when the updated booting instruction set of the firmware included in the BIOS update information is different from the booting instruction set of the firmware stored in the battery monitoring unit, said embedded controller is further configured to update the booting instruction set of the firmware stored in the battery monitoring unit with the updated booting instruction set; and wherein, when the BIOS is updated, the main instruction set of the firmware stored in said non-volatile memory is updated without updating the booting instruction set of the firmware.

13. The portable electronic device of claim 12, wherein said embedded controller is a keyboard controller.

* * * * *